(12) United States Patent
Mei et al.

(10) Patent No.: US 7,311,751 B2
(45) Date of Patent: Dec. 25, 2007

(54) FILTER MEDIUM

(75) Inventors: Feng Mei, Gent (BE); Willy Marrecau, Rome, GA (US)

(73) Assignee: NV Bekaert SA, Zwevegem (BE)

( * ) Notice: Subject to any disclaimer, the term of this patent is extended or adjusted under 35 U.S.C. 154(b) by 532 days.

(21) Appl. No.: 10/497,907

(22) PCT Filed: Dec. 5, 2002

(86) PCT No.: PCT/EP02/14913

§ 371 (c)(1),
(2), (4) Date: Jul. 2, 2004

(87) PCT Pub. No.: WO03/047720

PCT Pub. Date: Jun. 12, 2003

(65) Prior Publication Data

US 2005/0223688 A1    Oct. 13, 2005

(30) Foreign Application Priority Data

Dec. 7, 2001    (EP) .................................. 01204963

(51) Int. Cl.
*B01D 39/20* (2006.01)

(52) U.S. Cl. ............................. 55/527; 55/482; 55/485; 55/486; 55/487; 55/522; 55/528; 95/285; 210/487; 210/489; 210/492; 210/496; 210/499; 210/510; 422/171; 422/177; 422/180; 422/211; 422/222; 428/605

(58) Field of Classification Search ................. 55/482, 55/485–487, 522–528; 95/285; 210/487, 210/489, 492, 496, 499, 510; 428/605; 422/171, 422/177, 180, 211, 222

See application file for complete search history.

(56) References Cited

U.S. PATENT DOCUMENTS

| 3,087,233 | A | * | 4/1963 | Turnbull ..................... 428/605 |
| 3,505,038 | A |   | 4/1970 | Luksch et al. |
| 3,690,606 | A | * | 9/1972 | Pall ............................ 428/605 |
| 4,126,560 | A | * | 11/1978 | Marcus et al. .............. 210/489 |
| 5,830,415 | A | * | 11/1998 | Maeda et al. ............... 422/171 |
| 2003/0084788 | A1 | * | 5/2003 | Fraser, Jr. .................... 95/285 |

FOREIGN PATENT DOCUMENTS

| DE | 196 11 150 A1 | 5/1997 |
| DE | 197 52 143 A1 | 5/1999 |
| EP | 0 612 551 B1 | 8/1994 |
| EP | 1 018 357 A1 | 7/2000 |
| WO | WO 97/04152 A1 | 2/1997 |
| WO | WO 01/00971 A1 | 1/2001 |

* cited by examiner

*Primary Examiner*—Minh-Chau T. Pham
(74) *Attorney, Agent, or Firm*—Foley & Lardner LLP

(57) ABSTRACT

A filter medium includes at least a first and a second layer. Both first and second layers have a layer volume VLq and a layer filtering surface SLq, where SLq is the accumulation of all mantle surfaces of the fibers present in this layer q. The first layer has a SL1/VL1-ratio of less than 32500 $m^2/m^3$, and the second layer has a SL2/VL2-ratio being more than $1.1 \times SL1/VL1$.

24 Claims, 1 Drawing Sheet

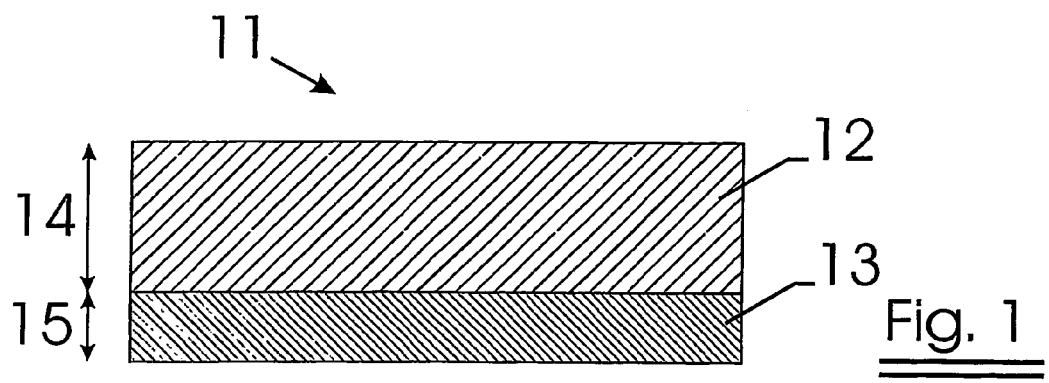
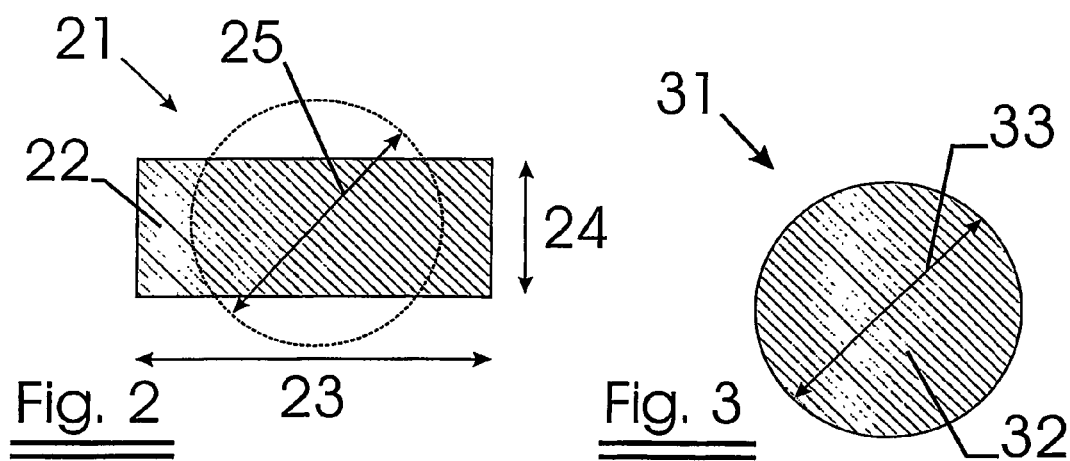
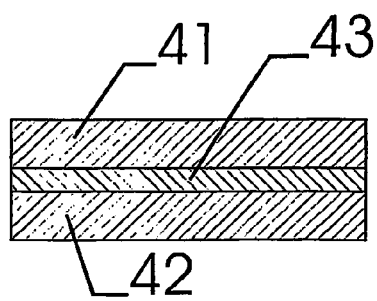
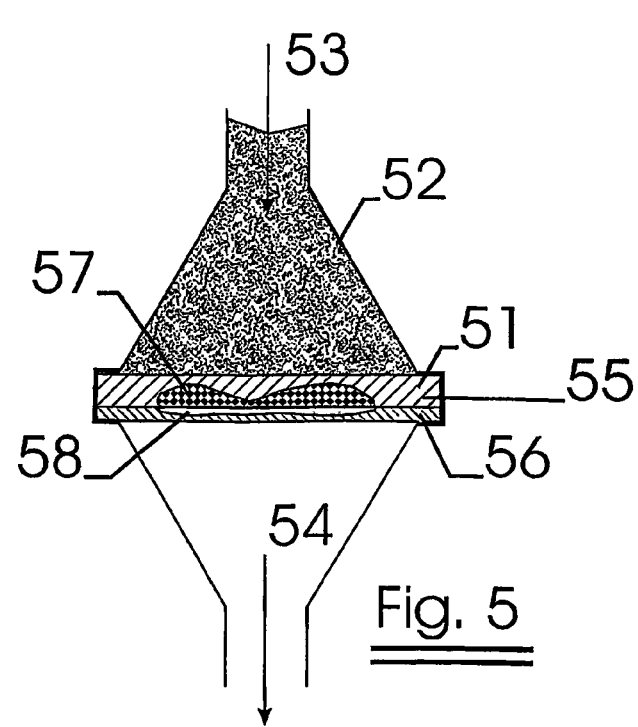

FILTER MEDIUM

FIELD OF THE INVENTION

The invention relates to a filter medium, adapted to be used as a filter medium, and the use of such filter medium to remove soot out of exhaust gasses of internal diesel combustion units.

BACKGROUND OF THE INVENTION

Filter media comprising fibers are often used for the purpose of removing soot out of exhaust gasses of combustion units.

Diesel soot filter media comprising metal and/or ceramic fibers are also known in the art, e.g. from WO01/00971.

Filter media comprising metal fibers and consisting of more than one layer of fibers are also known, e.g. from U.S. Pat. No. 3,505,038 and EP1018357.

SUMMARY OF THE INVENTION

It is an object of the invention to provide a filter medium, which is adapted to the use as a filter medium for combustion units.

According to the present invention, it was found that such filter media, which comprises fibers, are to comprise at least two different fiber layers, hereafter referred to as first and second layer.

Each layer "q" has a certain "layer volume" (VLq), expressed in $m^3$, which is the volume defined by the outer dimensions of the layer q of the filter medium. Usually, but not restrictively, the filter medium is a plane surface, having a length, a width and a thickness.

Further each layer q has a certain "layer filtering surface" (SLq), expressed in $m^2$. SLq is defined as the accumulation of all mantle surfaces or the fibers, present in the layer q of the filter medium. The mantle surface of a fiber is the surface being essentially parallel to the axis of the fiber. This mantle surface may be calculated as $$SLq = Lq * Aq$$

Wherein
→Lq is the sum of the fiber lengths present in layer q;
→Aq is the perimeter of the fibers present in layer q.

The term "layer" herein used it to be understood as a volume-part of the filter medium, which has substantially equal properties throughout its volume.

According to the present invention, a filter medium is provided having a first layer (q=1), which layer has an SL1/VL1-ratio of less than 32500 $m^2/m^3$. This filter medium has a second layer (q=2) which layer has an SL2/VL2 which is more than 1.1×SL1/VL1, preferably more than 1.25×SL1/VL1 or even more than 1.4×SL1/VL1

In order to meet the requirements of the filter medium, the thickness of the filter medium, through which the exhaust gas, which is to be filtered, is to flow, may be chosen. Preferably, the thickness of the first layer of filter medium as subject of the invention is larger than 0.2 mm, most preferably larger than 0.5 mm or even larger than 0.75 mm. Preferably, the thickness of the second layer of filter medium as subject of the invention is larger than 0.05 mm, or even larger than 0.1 mm, most preferably larger than 0.15 mm. Preferably this thickness is less than 1 mm or even less than 0.5 mm.

Required SLq/VLq-ratios are obtained by selectively choosing and combining the porosity of the layer and the fiber equivalent diameter and surface shape of the fibers.

A porosity Pq of a layer q is expressed in %, being $$\frac{\text{the volume of air, present in the volume of layer } q * 100}{\text{the volume of layer } q}$$

Preferably, the porosity of the first layer (P1) is more than 50% and most preferably in the range of 80% to 95%.

Preferably, the porosity of the second layer (P2) less than 90% and most preferably is in the range of 50% to 87%.

According to the present invention, each layer q of the filter medium comprises fibers. Preferably, each layer comprises more than 70% vol or even more than 80% vol of fibers. Possibly one or more layers consist of fibers additional to the fibers, other elements such as powders can be comprised by each of the layers.

Fibers, providing the different layers q of the filter medium, are characterised by an equivalent diameter (Dq), a surface shape and an "average length (LMq) to equivalent diameter"—ratio (LMq/Dq).

With the term "equivalent diameter" is meant the diameter of an imaginary circle, which has the same surface as the surface of a fiber section, cut perpendicular to the major axis of the fiber. Fibers used to provide the layers of the filter medium as subject of the invention, preferably are in the range of 0.5 μm to 100 μm. Usually, the first layer consist of fibers with D1 in the range of 22 μm to 100 μm, whereas the second layer usually consist of fibers having D2 in the range of 0.5 μm to 35 μm. Preferably the equivalent diameter of the fibers in the first layer is larger than the equivalent diameter of the fibers in the second layer. Possibly, two or more different fibers with different equivalent diameter may be used to provide a layer. It is to be clear that the total mantle surface of this layer is to be calculated as the sum of the mantle surfaces of the length of each fiber type which is present in this layer. The ration average length LMq over equivalent diameter Dq, being LMq/Dq is preferably more than 5 or 10 or even more than 25 or 50, most preferably more than 100.

The shape of the surface of the fibers may vary to a large extend. This shape is defined by the geometrical figure of a radial cross section of the fiber. This may e.g. be rectangular or square, circular, triangular, or comprise a rather serrated section circumference. For most fibers used, the shape of a radial section is essentially identical over the whole length of the fiber. The shape of the fibers, present in layer q, is also essentially identical for all fibers used to provide this layer q. the shape defines to a large extend the perimeter Aq of the fibers present in layer q.

Preferably, the dimensions of the layers are chosen in such a way that the ratio VS, being the "volume of air in the filter medium" over the "total fiber length in the filter medium" is more than 1000, preferably more than 5000. This ratio VS may be calculated as the sum of the corresponding ratios of each layer q, thus $$VS = \sum_{q=1}^{x} VSq$$

x being the number of layers and for each layer q:

$$VSq = \frac{(Pq/100) * VLq}{Lq}$$

Wherein
Pq being the porosity of layer q
Lq being the sum of the fiber lengths present in layer q
VLq being the volume of layer q Preferably, the filter medium as subject of the invention consist of high temperature resistant fibers such as metal and/or ceramic fibers.

Most preferably, the layers comprises only fibers out of metal, which e.g. may be obtained by bundled drawing or shaved from a coiled plate as described more in detail in WO97/04152, or provided by any other process as known in the art.

According to the specific use of the filter medium, different metals and/or alloys, preferably stainless steel fibers, may be used to provide the metal fibers.

The alloy of metal or steel may be chosen dependent on the temperature range which is to be withstand by the metal fibers. Stainless steel fibers of AISI alloys of the 300- or 400 series, or alloys such as INCONEL® are to be preferred. In case high temperatures are to be withstand, alloys comprising Fe, Al and Cr are preferred, such as FECRALLOY®.

In case the metal fibers are obtained by shaving from a coiled plate as described more in detail in WO97/04152, a radial section of such metal fiber is essentially rectangular. The length of both sides are to be taken into account for calculating SL of the layer comprising such fibers.

In case the metal fibers are obtained by bundled drawing, the metal fibers have an essentially circular of pentagonal radial section. It was found that the circumference of the fiber radial section is sufficiently approximated by using the circumference of the imaginary circle, having the same surface as the surface of the radial section of the fiber.

Most preferably, the filter medium, comprising at least two layers, consisting of metal fibers, is sintered in order to bond the metal fibers in each layer, and to bond the different layers to each other.

The first and the second layer may be sintered and brought to the required porosity separately during a first sintering cycle. After being superposed to each other, they are sintered to each other during a second sintering cycle. Alternatively, the first and second layer may be superposed to each other before sintering. During one sintering cycle, both layers are sintered and the layers are bond to each other by the sintering operation.

Possibly, although not necessarily, the filter medium may comprise more than 2 layers. An extra intermediate layer may be located between the first and the second layer, e.g. in order to improve the bonding between both layers during sintering.

A filter medium as subject of the invention is adapted to be used as a diesel soot filter medium.

Such use comprises the steps of providing a filter medium as subject of the invention, conducting exhaust gas, out of which soot is to be removed, through the filter medium, and retaining the soot particles out of the exhaust gas in the filter medium.

It is clear that the filter medium may be plane, or may be present in the filter cartridge, comprising the filter medium, as a pleated surface. The latter is even preferred, in order to provide more filtering surface in the filter cartridge.

The exhaust gas is conducted through the filter medium using the first layer as the inflow side of the filter medium, and the second layer as the outflow side of the filter medium.

The first layer of the filter medium as subject of the invention acts as a layer to slow down the soot particles being forced to flow through the layer, and possibly retain these particles. Due to the relatively large pores, and the relatively restricted amount of fiber mantle surface in the layer, particles moving through the layer may hit fiber surface, or have to flow crisscross through the pores. The kinetic energy of the particles is reduced and/or even reduced to zero. In the latter case, the particle is retained in the pore volume of the first layer. Other, usually smaller particles may still have some kinetic energy left when the have passed the first layer.

Those small particles are retained by the second layer, usually at its surface which contacts the first layer. Since this second layer filters essentially at its surface, its thickness may be limited.

Depending on the velocity of the exhaust gas, the thickness of the first layer is to be chosen. Preferably, the thickness is larger than 0.2 mm, most preferably larger than 0.5 mm The thickness of the second layer ranges preferably from 0.05 to 0.5 mm or 1 mm in order to limit the pressure drop over the whole filter medium.

According to the present invention, it was found that a filter medium comprising at least two layers, first layer having a SL1/VL1 less than 32500 $m^2/m^3$ and a second layer with SL2/VL2 being at least 1.1×SL1/VL1, may have a soot retention of more than 70% or even more than 90% and an acceptable pressure drop. Such an acceptable pressure drop is defined by the specific combustion unit for which the filter medium is used.

A maximal soot retention of more than 5 $g/m^2$, or even more than 8 $g/m^2$ is obtained if further the VS of the filter medium is kept more than 1000, most preferably more than 5000. This soot retention is also obtained while providing an acceptable pressure drop. E.g. 8 g $m^2$ may be achieved with a pressure drop of 70 mBar. Identical soot retention can also be obtained using presently known ceramic filter media, however a pressure drop of 200 mBar is than provided. In general a filter medium as subject of the invention needs only approximately ⅓ of the pressure drop in order to reach a specified level of soot retention, as compared to presently known ceramic filter media.

Characteristic parameters of the filter medium as subject of the invention is chosen in such a way that the criteria of the filter medium as subject of the invention are not met, have a relatively less performance as filter media according to the present invention.

BRIEF DESCRIPTION OF THE DRAWINGS

The invention will now be described into more detail with reference to the accompanying drawings wherein FIG. 1 being a schematically view of a cross section of a filter medium as subject of the invention;

FIG. 2 shows schematically an alternative filter medium as subject of the invention;

FIG. 3 shows schematically a radial cross section of a fiber with rectangular cross section.

FIG. 4 shows schematically a radial cross section of a fiber with circular cross section.

FIG. 5 shows schematically a filter medium being used as a soot trap in a diesel exhaust system.

DESCRIPTION OF THE PREFERRED EMBODIMENTS OF THE INVENTION

A preferred embodiment of a filter medium is shown schematically in FIG. 1.

A filter medium 11 comprises a first layer 12 and a second layer 13. Each layer preferably comprises or even consists of metal fibers, of an alloy resistant to high temperatures, such as an Fe—Cr—Al alloy, e.g. FECRALLOY®.

The first layer 12 comprises coil-shaved fibers as shown in FIG. 2. Those coil-shaved fibers 21 have an essentially rectangular radial section 22, which is characterized by a long side 23 and a short side 24. Preferably, fibers with equivalent diameter 25 of 35 μm are used, having a long side 23 of 50 μm and a short side 24 of 19 μm. The fibers have a circumference, of 135 μm.

The first layer preferably has a porosity of 85%.

A porosity of 85% means that 15% of the volume of the layer is occupied by metal fibers of equivalent diameter 25 of 35 μm. That means that for each mm³ of filter medium, 157.9 mm length of metal fibers with equivalent diameter of 35 μm are to be provided. Taking into account the rectangular shape of the radial section, having a circumference of 138 μm, it defines that in each mm³ of filter medium $$157.9 \text{ mm} * 0.138 \text{ mm} = 21.789 \text{ mm}^2$$

mantle surface or layer filtering surface SL1 is present for each mm³ layer volume VL1.

A SL1/VL1-ratio of 21789 m²/m³ is provided.

A layer thickness 14 is preferably in the range of 0.4 to 0.8 mm

The second layer 13 comprises bundled drawn fibers as shown in FIG. 3. Those bundled drawn fibers 31 have an essentially circular radial section 32, which is characterized by an equivalent diameter 33. Preferably, fibers with equivalent diameter of 17 μm are used. The fibers have a circumference or perimeter of 53.4 μm.

The second layer 13 preferably has a porosity in the range of 60 to 85% and a thickness 15 in the range of 0.1 mm to 0.55 mm.

For a porosity of the second layer 13 of 60% it means that for each mm³ of filter medium, 1762.3 mm length of bundled drawn metal fibers with equivalent diameter of 17 μm are to be provided. Taking into account the circular shape of the radial section, having a circumference of 53.4 μm, it defines that in each mm³ of filter medium $$1762.3 \text{ mm} * 0.0534 \text{ mm} = 94.0 \text{ mm}^2$$

mantle surface or filtering surface SL2 is present.

An SL2/VL2-ratio of 94109 m²/m³ is provided. The filter medium has a SL2/VL2 which is 4.3×SL1/VL1. The filter medium has a VS=5724.

In case the porosity of the second layer 13 is increased to 85%, using the same fibers, an SL/VL-ratio of 35291 mm²/mm³ is provided. The filter medium has a SL2/VL2 which is 1.6×SL1/VL1. The filter medium has a VS=6669.

Alternatively, The second layer 13 may be provided from coil-shaved metal fibers of equivalent diameter of 22 μm, and having a rectangular shape with long side of 25 μm and short side of 15 μm. A porosity of the second layer 13 of 60% provides an SL2/VL2-ratio of 121263 m²/m³, whereas a porosity of 85% provides an SL2/VL2-ratio of 45474 m²/m³. SL2/VL2 is 5.6×SL1/VL1 for a porosity of layer 13 of 60% and SL2/VL2 is 2.1×SL1/VL1 for a porosity of layer 13 of 85%. The filter medium has a VS=5953 for 60% porosity and VS=7537 for 85% porosity.

Both layers are sintered separately, and, after been positioned one on top of the other, sintered to each other. Alternatively, the layers may be positioned one on top of the other before sintering. Only one sintering operation is necessary then.

A soot retention of more than 60% is obtained, meanwhile having a dirt holding capacity of more than 11 g/m² for each of the above mentioned embodiments. These results are obtained for a back-pressure of 80 mBar and an exhaust velocity of 80 cm/s.

An alternative filter medium is provided in FIG. 4. The filter medium comprises three layers of fibers, e.g. stainless steel metal fibers out of a Fe—Cr—Al-alloy. A first layer 41 is identical as the first layer 12 of FIG. 1, having a porosity of 85% and comprising coil shaved fibers with equivalent diameter of 35 μm. This layer has an SL1/VL1-ratio of 21789 m²/m³. The thickness of this first layer is preferably 0.52 mm.

The second layer 42 is identical to the second layer 13 of FIG. 1, comprising bundle drawn metal fibers of equivalent diameter 17 μm and having a porosity of 85%. This second layer 42 has an SL2/VL2-ratio of 35291 mm²/mm³. The thickness of this layer is preferably 0.52 mm.

Between both layers, a third layer 43 is inserted, having a thickness of 0.21 mm, and a porosity of 85%. This layer is provided using 22 μm metal fibers being coil shaved. For this third layer 43 has an SL3/VL3-ratio of 31579 mm²/mm³ may be calculated.

The filter medium has a SL2/VL2 which is 1.6×SL1/VL1. The filter medium has a VS=8893.

A soot retention of more than 91% is obtained, and a dirt holding capacity of more than 26 g/m². These results are obtained for a back-pressure of 100 mBar and an exhaust velocity of 25 cm/s.

Alternative filter media, either according to FIG. 1 having two layers, or according to FIG. 4, having a third layer, may be obtained by varying the different parameters of the layers q, being e.g. porosity, thickness, fiber characteristics and VSq.

These embodiments may be used as filter medium to retain soot out of exhaust gasses, coming from a diesel internal combustion unit. As shown in FIG. 5, a filter medium as subject of the invention 51 is installed in a diesel exhaust system 52. Exhaust gasses are conducted to the filter medium as indicated with arrow 53 indicating the direction of gas to be filtered, which flow through the filter medium 51 and leaves the exhaust system again as indicated with arrow 54. The first layer 55 of the filter medium 51 is used as inflow side of the filter medium 51, whereas the second layer 56 is the outflow side of filter medium 51.

Soot particles are trapped in the filter medium. Larger soot particles 57 are retained in the first layer 55, whereas the finest particles 58 are retained at the second layer 56.

When the above described preferred embodiments are used to filter soot out of exhaust gas from a diesel internal combustion unit, e.g. a diesel engine, a filter efficiency of 90% or more may be reached.

The invention claimed is:

1. A filter, comprising:
   a filter medium comprising an inflow side and an outflow side, wherein the filter medium comprises at least a first layer and a second layer, wherein said layers comprise fibers, wherein the first layer provides the inflow side and the second layer provides the outflow side, wherein both first and second layers have a layer volume VLq and a layer filtering surface SLq, wherein said first layer has a SL1/VL1-ratio of less than 32500 m$^2$/m$^3$, wherein said second layer has a SL2/VL2-ratio more than 1.1×SL1/VL1.

2. A filter as in claim 1, wherein said first layer has a thickness of more than 0.2 mm.

3. A filter as claimed in claim 1, wherein said first layer has a thickness of more than 0.5 mm.

4. A filter as claimed in claim 1, wherein said first layer comprises fibers having an equivalent diameter in the range of 22 μm to 100 μm, wherein said second layer comprises fibers having an equivalent diameter in the range of 0.5 μm to 35 μm.

5. A filter as claimed in claim 1, wherein said first layer consists of fibers having an equivalent diameter in the range of 22 μm to 100 μm, wherein said second layer consists of fibers having an equivalent diameter in the range of 0.5 μm to 35 μm.

6. A filter as claimed in claim 1, wherein said first layer has a porosity of more than 50%, wherein said second layer has a porosity of less than 90%.

7. A filter as claimed in claim 1, wherein said first layer has a porosity in the range of 80% to 95%, wherein said second layer has a porosity in the range of 50 to 87%.

8. A filter as claimed in claim 1, wherein said filter medium comprises metal fibers.

9. A filter as claimed in claim 8, wherein said filter medium consists of metal fibers.

10. A filter as claimed in claim 9, wherein said first and said second layer consist of sintered metal fibers.

11. A filter as claimed in claim 1, wherein said layers are sintered to each other.

12. A filter as claimed in claim 8, wherein said metal fibers are obtainable by bundled drawing.

13. A filter as claimed in claim 8, wherein said metal fibers are obtainable by coil shaving.

14. A filter as claimed in claim 1, wherein said medium further comprises a third layer being present between said first layer and said second layer.

15. A filter as claimed in claim 1, wherein said filter medium has a VS more than 1000, wherein said VS is the sum for all layers of VSq, wherein VSq is the ratio of the volume of air in layer q divided by the total length of said fibers present in said layer q.

16. A method of using a filter as claimed in claim 1 to remove soot out of exhaust gasses of an internal diesel combustion unit.

17. A method of using a filter, comprising the steps of:
providing a filter as claimed in claim 1;
conducting exhaust gasses of an internal diesel combustion unit to said filter;
retaining soot out of said exhaust gasses in the filter.

18. A filter as claimed in claim 1, wherein the first layer has a thickness in the range of 0.4 mm to 0.8 mm.

19. A filter as claimed in claim 1, wherein the first layer has a thickness in the range of 0.1 mm to 0.55 mm.

20. A filter as claimed in claim 1, wherein the filter medium further comprises an intermediate layer being located between the first layer and the second layer.

21. A filter as claimed in claim 20, wherein the first layer has a thickness in the range of 0.4 mm to 0.8 mm.

22. A filter as claimed in claim 21, wherein the first layer has a thickness in the range of 0.1 mm to 0.55 mm.

23. A filter as claimed in claim 22, wherein the filter medium consists of the first layer, the second layer, and the intermediate layer.

24. A filter as in claim 2, said second layer having a thickness of more than 0.05 mm.

\* \* \* \* \*